Figure 1:
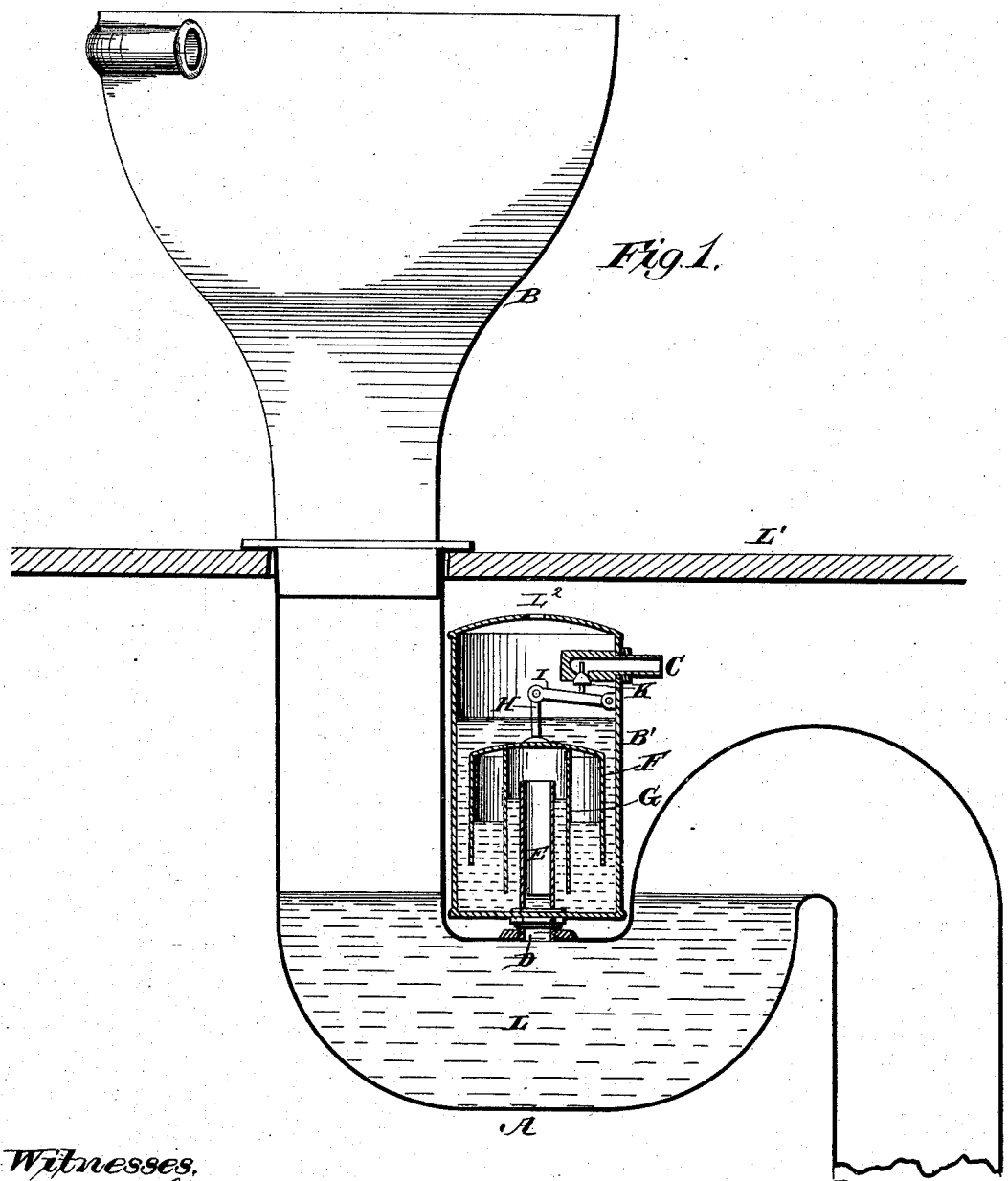

(No Model.)  2 Sheets—Sheet 1.

J. P. HYDE.
MEANS FOR PRESERVING THE SEAL IN TRAPS OF WATER CLOSETS, URINALS, WASH BASINS, SINKS, &c.

No. 288,573.  Patented Nov. 13, 1883.

Witnesses,
Robert Everett,
J. A. Rutherford

Inventor:
James P. Hyde,
By James L. Norris,
Atty.

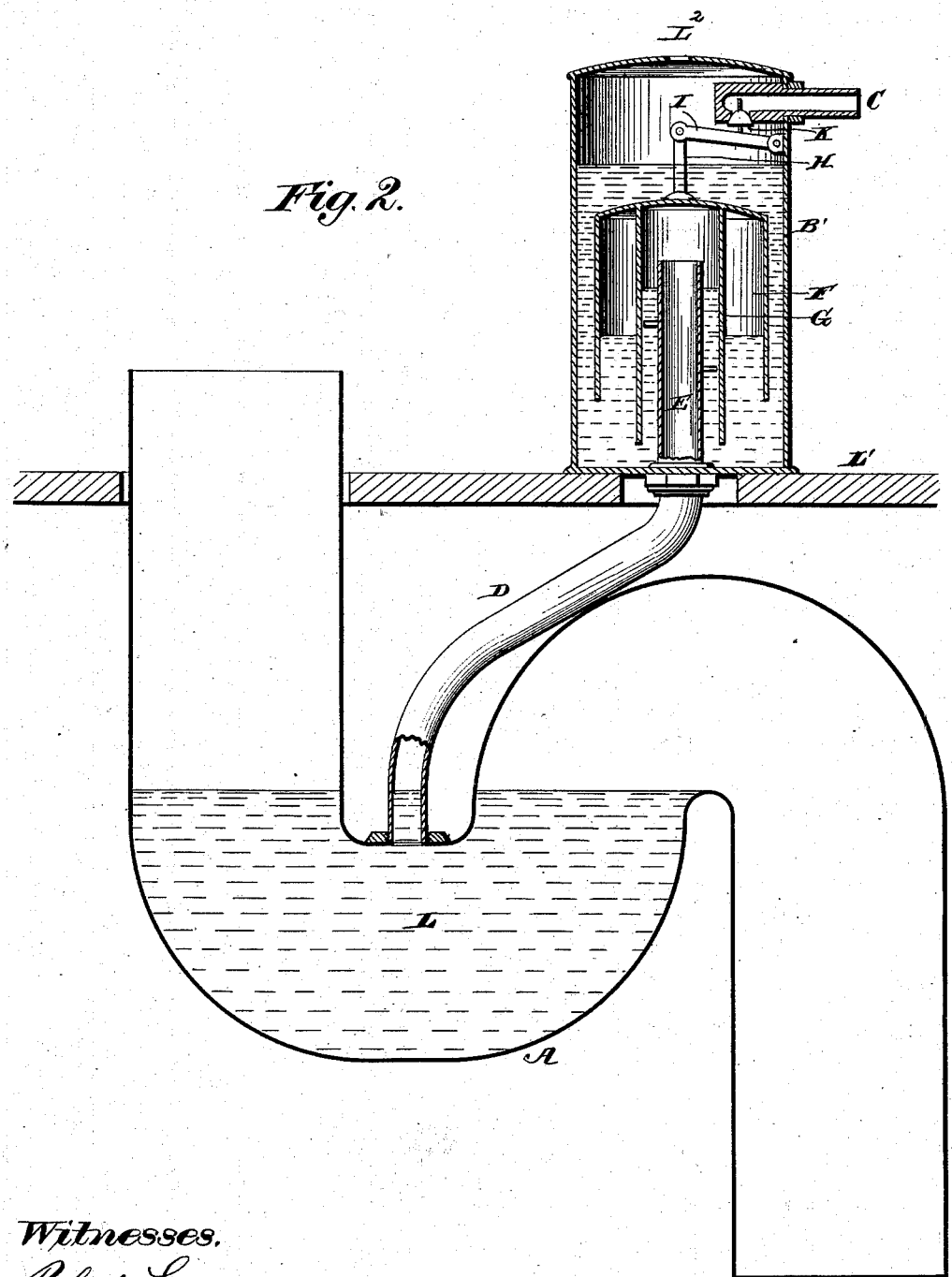

UNITED STATES PATENT OFFICE.

JAMES P. HYDE, OF NEW YORK, N. Y.

MEANS FOR PRESERVING THE SEAL IN TRAPS OF WATER-CLOSETS, URINALS, WASH-BASINS, SINKS, &c.

SPECIFICATION forming part of Letters Patent No. 288,573, dated November 13, 1883.

Application filed September 28, 1882. (No model.)

*To all whom it may concern:*

Be it known that I, JAMES P. HYDE, a citizen of the United States, residing at New York, in the county and State of New York, have invented new and useful Improvements in Means for Preserving the Seal in Traps of Water-Closets, Urinals, Wash-Basins, Sinks, &c., of which the following is a specification.

The object of my invention is to provide novel and efficient means for maintaining a supply of water in readiness to be automatically delivered into and seal the trap of a water-closet, wash-basin, urinal, or the like whenever the water in the trap is drained or siphoned off. This object I accomplish by the means illustrated in the accompanying drawings, in which—

Figure 1 is a section on a vertical plane through a trap provided with my improved attachment, the trap in this instance being employed in connection with a water-closet bowl. Fig. 2 is a like view with the attachment located above the floor and the pipe unattached to a water-closet bowl or other receptacle.

Referring by letter to the drawings, A indicates the trap in a soil or waste pipe leading from the bowl of a water-closet or from a wash-basin or urinal. In Fig. 1 the pipe is shown connected with a water-closet bowl, B, while in Fig. 2 it is left free, to be connected with either a bowl, basin, or urinal, as may be desired.

B' indicates a closed water-reservoir, which is supplied through a pipe, C, entering the upper portion of the reservoir. This reservoir connects with the upper portion of the trap between the two bends of the latter by a pipe, D. This pipe connects with a stand-pipe, E, within the reservoir; or it can be passed up through the bottom of the reservoir, so as to form a stand-pipe thereon. This pipe-connection is adapted to conduct water from the reservoir to the trap whenever the water within the reservoir rises over the upper terminal of the stand-pipe.

A bell, F, arranged within the reservoir and over the stand-pipe E, is provided with an inner cylindrical shell, G, secured at its upper end to the cap-plate of the bell. This inner shell, which is open at its lower end and extended somewhat below the outer shell of the bell, is placed over the stand-pipe, and is of sufficient diameter to provide an annular space between the inner wall and the stand-pipe. The bell is connected by a link, H, with a pivoted lever, I, which carries a valve, K, arranged to open and close the outlet of the supply-pipe C, thereby allowing or cutting off the flow of water from the supply-pipe into the tank or reservoir.

The valve, which connects either by the link and lever or other suitable connection with the bell, is operated by the rise and fall of the latter within the reservoir, the said connections being so arranged that when the bell rises at the proper moment it will close the valve, and when it falls it will open the same.

The mode of operation is as follows: So long as the trap is sealed, as indicated in the drawings, in which L refers to the body of water within the trap, a portion of such water will rise either in the stand-pipe or in the pipe which connects the trap with the stand-pipe, according to the location of the reservoir and the length of its pipe-connection with the trap. Thus in Fig. 1 the reservoir is arranged between the bends of the waste-pipe and connected with the trap by a short pipe, which can be simply the lower end of the stand-pipe extended below the bottom of the reservoir and screwed into or otherwise connected by a tight joint with the waste-pipe. In this figure the reservoir is located below the floor L', while in Fig. 2 the reservoir is arranged upon the floor, and hence the pipe D, between the trap and the stand-pipe, is made somewhat longer. In either case, however, the result will be the same—that is to say, when the trap is sealed the lower end of the passage between the trap and the air-space within the upper portion of shell G will be closed by the water contained in the trap. Under such conditions the bell will be raised in the body of water within the reservoir, so as to close the valve by reason of atmospheric pressure upon the water, which will rise to a certain extent within the two chambers of the bell, and thereby compress the air in the upper portions of said chamber. Now, should the water, from any cause whatever, drain or siphon off from the trap, so as to open the passage between the trap and the reservoir, the atmospheric pressure upon the body of water within the reservoir will cause the water to rise within the space between jacket G and the stand-pipe, so as to flow into the latter and thence pass down into the trap, in order to again fill and seal the latter.

It will be seen that prior to such unsealing of the trap the air within the upper part of jacket G, and also the air within the passage between the same and the trap, will be compressed and constitute an elastic cushion, which will serve both to uphold the bell, and to prevent the water within the reservoir rising and flowing into the stand-pipe. As soon, however, as the equilibrium of pressure is destroyed by reason of the water within the trap becoming lower than the lower end of the passage between the trap and the reservoir, the water will then rise around the stand-pipe and flow down through the passage therein, and at the same time the bell will be allowed to drop sufficiently to open the valve, and thus allow the inflow of water from the supply-pipe into the reservoir. As the water continues to flow through the pipe-connections between the reservoir and the trap it will fill and reseal the latter.

The bell might be operated by hand, in which case a rod or cord would be connected with the bell and passed up through the reservoir; but when operating automatically there will be no need of any attention being given to it. The vent L' in the top of the reservoir allows air to flow into the same, so as to supply the air requisite for the cushion between the water in the reservoir and the water in the trap.

Having thus described my invention, what I claim is—

1. The combination, with a trap, of a water-tank elevated above the trap, and having a pipe leading therefrom and connected with the trap below its overflow point or level, whereby the lower end of the pipe is submerged so long as the water-seal of the trap remains unbroken, and means whereby a supply of water is forced from the tank into the trap to reseal the same whenever the water-seal therein falls below the overflow point or level of the trap and unseals the lower end of the pipe leading from the tank, substantially as and for the purpose described.

2. The combination, with the water-seal trap of a soil or waste pipe, of the water-reservoir, a stand-pipe arranged vertically therein, a connection between the lower end of said pipe and the trap, and a bell arranged over the end of the stand-pipe, the said bell by its vertical movements opening and closing a valve to control the supply of water to the reservoir, substantially as described.

3. The combination, with the water-seal trap of a soil or waste pipe, of a water-reservoir provided with a water-supply pipe containing a valve located in the reservoir, a vertical stand-pipe extending into the latter and having its lower end connected with the trap between the bends thereof, a bell arranged over the stand-pipe in the reservoir, and devices connecting the upper end of the bell with the valve of the supply-pipe to the reservoir, substantially as described.

4. The combination, with the water-seal trap of a soil or drain pipe, of a water-reservoir provided with a water-supply pipe containing a valve within the reservoir, a vertical stand-pipe extending into the latter, a connection between the lower end of the stand-pipe and the top wall of the trap between its bends, a bell having a cylindrical shell and arranged over the stand-pipe, and the link H and pivoted lever I, connecting the upper end of the bell with the valve in the supply-pipe of the reservoir, substantially as described.

5. The combination, in a water-seal trap, of a water-reservoir containing a vertical stand-pipe, and a connection between the lower end of the stand-pipe and the top wall of the trap, between the bends thereof, substantially as described.

In testimony whereof I have hereunto set my hand in the presence of two subscribing witnesses.

JAMES P. HYDE.

Witnesses:
JAMES L. NORRIS,
J. A. RUTHERFORD.